K. A. F. HIORTH.
INDUCTION FURNACE.
APPLICATION FILED NOV. 20, 1906.

954,804.

Patented Apr. 12, 1910.
3 SHEETS—SHEET 1.

Witnesses
B. Sommers
Jesse N. Sutton

Inventor
Karl Albert Fredrik Hiorth
by Henry Orth Jr.
Atty

K. A. F. HIORTH.
INDUCTION FURNACE.
APPLICATION FILED NOV. 20, 1906.

954,804.

Patented Apr. 12, 1910.
2 SHEETS—SHEET 2.

Witnesses.
R. Sommers
Jesse K. Lutton.

Inventor
Karl Albert Fredrik Hiorth
by Henry Orth Jr.
Atty.

UNITED STATES PATENT OFFICE.

KARL ALBERT FREDRIK HIORTH, OF CHRISTIANIA, NORWAY.

INDUCTION-FURNACE.

954,804.  Specification of Letters Patent.  Patented Apr. 12, 1910.

Application filed November 20, 1906. Serial No. 344,305.

*To all whom it may concern:*

Be it known that I, KARL ALBERT FREDRIK HIORTH, a subject of the King of Norway, residing at Christiania, Norway, have invented certain new and useful Improvements in Induction-Furnaces; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention relates to induction furnaces and has for its object to provide means, whereby this type of furnaces may be used, for instance with the purpose of obtaining metal directly from ore by a reduction process or for manufacturing fine grades of steel by way of smelting.

My invention consists in the provision of means whereby the continuity of the annulus of molten metallic material in the annular hearth as partially or wholly broken, in combination with means, whereby the current may be led through the slag at the point where the annulus is broken.

I shall now describe the invention, reference being had to the drawings, showing different modes of carrying out the process.

Figure 1:
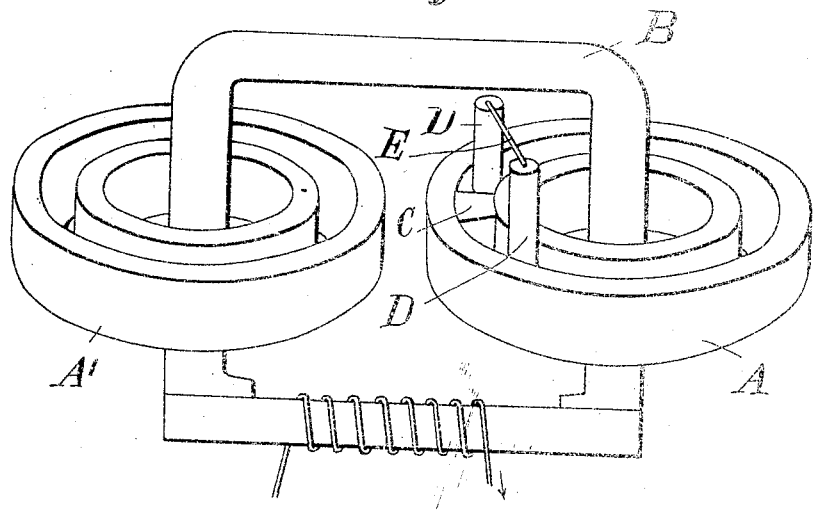
Figure 2:
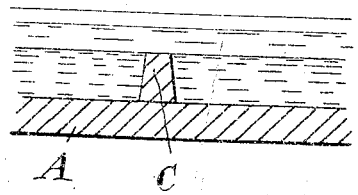
Figure 3:
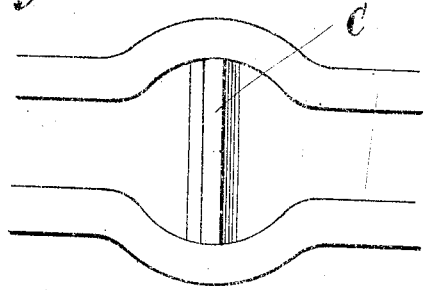
Figure 4:
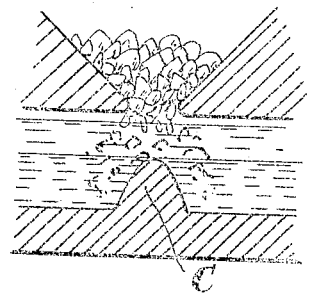
Figure 5:
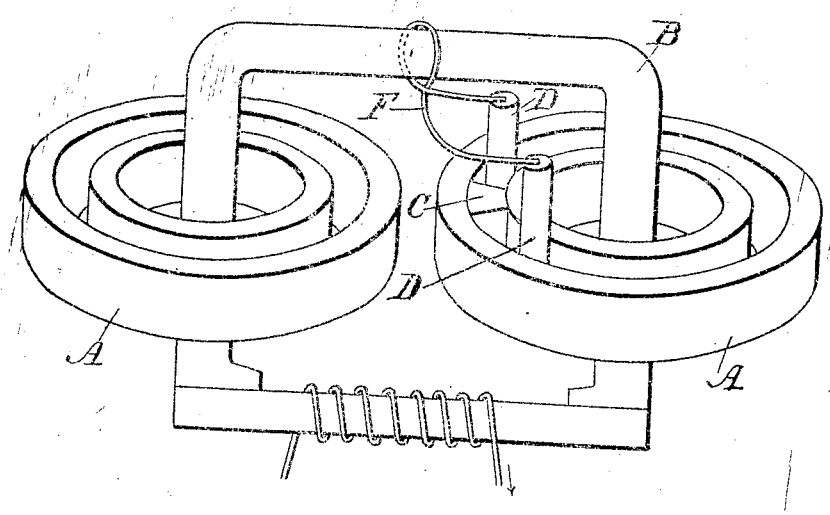
Figure 6:
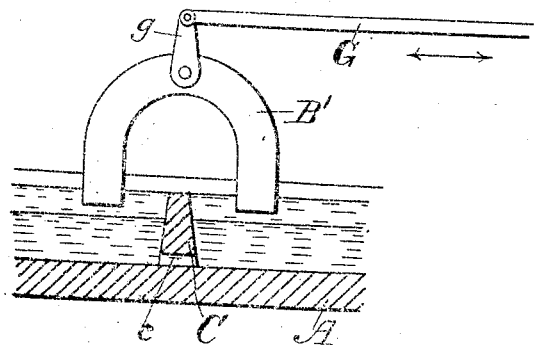

Figure 1 is a perspective view showing a furnace adapted for carrying out my invention. Fig. 2 is a sectional view illustrating another mode of carrying out my invention; Fig. 3 is a plan corresponding with Fig. 2. Fig. 4 shows another modification. Fig. 5 is a perspective view of a furnace similar to the one shown in Fig. 1 showing a modification. Fig. 6 is a sectional view illustrating another modification.

In the drawing Fig. 1 illustrates my invention applied to a double induction furnace as described in another application Serial Number 344,303, filed by me simultaneously with the present application.

A, A are induction furnaces having a common magnet ring or core B.

C is a bridge or a wall built up in the annular channel of one of the furnaces.

D, D are electrodes and E a connecting piece of conducting material between the electrodes, which latter are arranged to dip only in the slag. Instead of the connecting piece E, a conductor F may be used having a part which forms a secondary coil around the core B, as shown in Fig. 5.

The bridge C should be so arranged as to allow of being taken out, when the furnace is to be used as an induction furnace. The current will then cause an energetic heating of the metallic charge while the slag will be less heated. When the furnace is used with the bridge inserted and the electrode D in operation, the slag around the electrode terminals will be highly heated and so called "energetic" slags are obtained.

As shown in Fig. 6 bridge C may be provided with a narrow aperture c, which allows of a passage of the metallic charge.

I may carry out the two electrodes in the form of a double or horseshoe-formed electrode B', which may be mounted on a crane G, so that it is easily lifted. In some cases I suspend this horseshoe-electrode by a link g which is pivotally connected to the crane, so that it may be given an oscillatory movement, whereby the charge is given a wave motion, and new portions of the slag brought within the reach of the electrodes.

I may use several bridges as here explained in the furnace and combine them with electrodes.

The invention may also be carried out without electrodes as indicated in Fig. 2. In this instance the bridge C is only carried up to the bottom of the slag and the slag in this case forms the leading connection between the separated parts of the molten metallic charge. As mentioned above I may provide such bridges at several points and I may as indicated in Fig. 3 make the annular hearth wider, where the bridge is inserted in order to obtain a greater cross sectional area of molten slag and thereby a greater conducting capacity. I may also as shown in Fig. 4 provide the feeding chute right above the bridge, whereby the material fed down into the hearth will be exposed to the greatest heat and a rapid smelting down of the material is thereby secured.

I claim—

1. In an induction furnace, the combination with the annular hearth, of one or more bridges to decrease the sectional area of the annulus of the molten metallic charge, and an electrode dipping into the slag only on each side of the bridge and a current conducting device between the electrodes to cause an electric current to pass from the metallic charge on one side of the bridge to the metallic charge on the other side of the bridge through the slag and electrodes.

2. In an induction furnace, the combination with the annular hearth, of one or more bridges to decrease the sectional area of the annulus of the molten metallic charge, an electrode dipping into the slag only on each side of the bridge, a current conducting device between the electrodes and a secondary coil of a transformer included in said connection.

In testimony that I claim the foregoing as my invention, I have signed my name in presence of two subscribing witnesses.

KARL ALBERT FREDRIK HIORTH.

Witnesses:
 THS. BERG,
 JOLE VAALER.